United States Patent [19]

Langfeld

[11] Patent Number: 4,988,804
[45] Date of Patent: Jan. 29, 1991

[54] POLYAZO DYES OBTAINED BY SUCCESSIVE COUPLING OF H-ACID AND TWO FURTHER ANILINIC DIAZO COMPONENTS ON RESORCINOL OR THE LIKE

[75] Inventor: Horst Langfeld, Grenzach-Wyhlen, Fed. Rep. of Germany

[73] Assignee: Ciba-Geigy Corporation, Ardsley, N.Y.

[21] Appl. No.: 264,581

[22] Filed: Oct. 31, 1988

[30] Foreign Application Priority Data

Nov. 10, 1987 [CH] Switzerland ............ 4377/87

[51] Int. Cl.$^5$ .............. C09B 33/22; C09B 45/24; D06P 1/39
[52] U.S. Cl. .................. 534/684; 534/582; 534/680; 534/685
[58] Field of Search ............ 534/680, 684, 685, 582

[56] References Cited

U.S. PATENT DOCUMENTS

| | | | |
|---|---|---|---|
| 1,565,344 | 12/1925 | Vossen | 534/685 |
| 2,097,276 | 10/1937 | Gyr | 534/684 X |
| 2,152,652 | 4/1939 | Lange, I | 534/685 X |
| 2,153,531 | 4/1939 | Lange, II | 534/684 |
| 2,168,571 | 8/1939 | Krzikalla et al. | 534/685 X |
| 2,259,735 | 10/1941 | Crossley et al. | 534/685 X |
| 2,758,109 | 8/1956 | Huss et al. | 534/685 |
| 2,830,979 | 4/1958 | Goebel et al. | 534/684 |

FOREIGN PATENT DOCUMENTS

| | | | |
|---|---|---|---|
| 513842 | 11/1930 | Fed. Rep. of Germany | 534/685 |
| 1012664 | 4/1952 | France | 534/685 |
| 2439222 | 5/1980 | France | 534/685 |
| 160674 | 6/1933 | Switzerland | 534/680 |
| 174266 | 12/1934 | Switzerland | 534/685 |
| 251140 | 4/1926 | United Kingdom | 534/685 |

OTHER PUBLICATIONS

K. Venkataraman, The Chemistry of Synthetic Dyes, vol. 1, pp. 415–416, (1952).
C. I. Acid Brown 121 and 122 (Constitution Numbers 33520 and 33525.

Primary Examiner—Floyd D. Higel
Assistant Examiner—Fiona T. Powers
Attorney, Agent, or Firm—George R. Dohmann; Edward McC. Roberts

[57] ABSTRACT

Polyazo dyes obtainable by
(a) diazotizing 1-amino-8-hydroxynaphthalene-3,6-disulfonic acid and coupling onto a compound of the formula

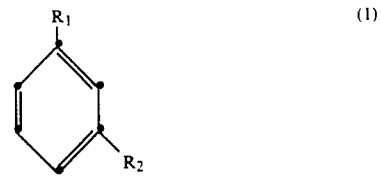

(b) coupling a diazotized compound of the formula

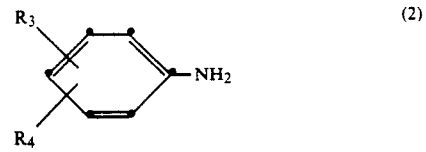

onto the monoazo dye thus obtained,
(c) coupling a diazotized compound of the formula

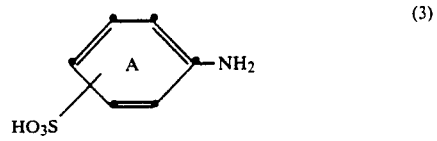

onto the product obtained as per (b), and (d) if desired metallizing the product obtained as per (c), the symbols in the formulae being as defined in claim 1, are suitable for dyeing a wide range of textile and nontextile materials, in particular leather.

4 Claims, No Drawings

POLYAZO DYES OBTAINED BY SUCCESSIVE COUPLING OF H-ACID AND TWO FURTHER ANILINIC DIAZO COMPONENTS ON RESORCINOL OR THE LIKE

The invention relates to novel polyazo dyes, the preparation thereof and the use thereof for dyeing a wide range of textile and nontextile materials, in particular leather.

The present invention provides in particular polyazo dyes obtainable by (a) diazotizing 1-amino-8-hydroxynaphthalene-3,6-disulfonic acid and coupling onto a compound of the formula

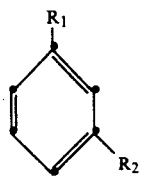  (1)

where $R_1$ and $R_2$ are independently of each other hydroxyl or amino, (b) coupling a diazotized compound of the formula

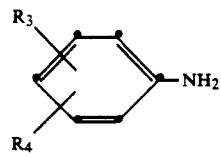  (2)

where $R_3$ and $R_4$ are independently of each other hydrogen, halogen, nitro, $C_1-C_4$alkyl, $C_1-C_4$alkoxy, sulfo or carboxyl, onto the product obtained as per (a), (c) coupling a diazotized compound of the formula

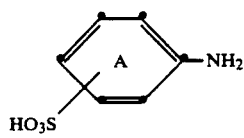  (3)

where the sulfophenyl radical A may be further substituted, onto the product obtained as per (b) and (d) if desired metallizing the product obtained as per (c).

Suitable compounds of the formula (1) are 1,3-diaminobenzene, 3-aminophenol and 1,3-dihydroxybenzene; of these, 1,3-dihydroxybenzene is preferred; that is, $R_1$ and $R_2$ in the formula (1) are each preferably hydroxyl. $R_3$ and $R_4$ are independently of each other for example hydrogen, halogen, for example fluorine, bromine or in particular chlorine, nitro, $C_1-C_4$alkyl, which is generally to be understood as meaning methyl, ethyl, n- or iso-propyl, or n-, sec- or tert-butyl, $C_1-C_4$alkoxy, which generally comprises methoxy, ethoxy, n- or iso-propoxy or n-, sec- or tert-butoxy, sulfo or carboxyl.

Preferably, $R_3$ and $R_4$ are independently of each other hydrogen, chlorine, nitro, methyl or methoxy, and particularly preferably $R_3$ is hydrogen and $R_4$ is chlorine, nitro, methyl or methoxy.

A particularly preferred embodiment of the present invention relates to polyazo dyes obtainable by using o-, m- or in particular p-nitroaniline as a compound of the formula (2).

The sulfophenyl radical A in the compounds of the formula (3) does not carry any further substituents or is further substituted for example by hydroxyl, nitro, $C_1-C_4$alkyl, $C_1-C_4$alkoxy, halogen and/or carboxyl.

Preferably, the sulfophenyl radical A is further substituted by one or more radicals selected from the group consisting of hydroxyl, nitro, methyl, methoxy and chlorine.

The polyazo dyes which are particularly preferred according to the invention are obtainable by using in process step (c) a compound of the formula

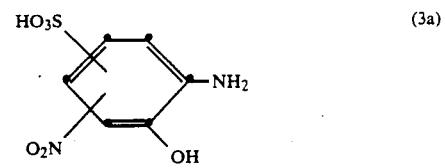  (3a)

The diazotization of 1-amino-8-hydroxynaphthalene-3,6-disulfonic acid in (a) and of the compounds of the formulae (2) and (3) in (b) and (c) are each effected in a manner known per se, for example with a nitrite, for example an alkali metal nitrite such as sodium nitrite, under acid conditions at temperatures of $-5°$ to $25°$ C., preferably $0°$ to $10°$ C.

The coupling reactions (a), (b) and (c) are likewise carried out under customary conditions known per se. Each time it is advantageous to work in an aqueous medium at a slightly acid, neutral or alkaline pH and at temperatures of about $0°$ to $25°$ C., preferably at $0°-10°$ C. With each of the coupling reactions (a), (b) and (c) the preference is for a neutral or alkaline medium, in particular a slightly alkaline medium, i.e. a medium having a pH of 7.5 to 12, in particular 8 to 9.0; in the case of coupling reaction (a) a pH of 8.5 to 9.0 is particularly preferred. Similarly, coupling steps (b) and (c) are particularly preferably carried out at a pH of 8.5 to 9.0; the pH can be set by adding bases, for example alkali metal hydroxides or carbonates, ammonia or an amine.

The compound of the formula (1) is used in an amount of for example 0.95 to 1.5 moles, preferably 1.0 to 1.25 moles, per mole of 1-amino-8-hydroxynaphthalene-3,6-disulfonic acid. The compounds of the formulae (2) and (3) are in general used in at least equimolar amounts, preferably in a certain excess which can be up to 100%, based on the products obtained as per ((a) and ((b) respectively.

The polyazo dyes obtained as per the above-described process may subsequently, if desired, be metallized in a manner known per se, for example with an iron, cobalt, chromium, nickel or copper compound, to form the corresponding 1:1 or 1:2 iron, cobalt, chromium, nickel or copper complexes.

The metallization is carried out in a manner known per se, for example in an aqueous medium at temperatures of $10°$ to $100°$ C., preferably $20°-50°$ C., under atmospheric pressure at a pH of 3 to 12, preferably 3 to 9.

Possible metal-donating agents are for example iron(II) or iron(III) chloride, sulfate or nitrate, cobalt acetate, sulfate or chloride, nickel acetate, formate, sulfate or chloride, chromium fluoride, sulfate, acetate, formate or salicylate, or copper carbonate, chloride, sulfate or acetate.

Particularly good dyeing results are obtained with polyazo dyes obtainable by ((a) diazotizing 1-amino-8-hydroxynaphthalene-3,6-disulfonic acid and coupling at a pH of 8.0 to 9.0 onto 1,3-dihydroxybenzene, ((b) coupling a diazotized compound of the formula

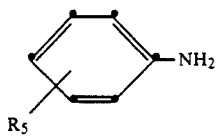

(2a)

where $R_5$ is chlorine, nitro, methyl or methoxy, onto the product obtained as per ((a) and ((c) coupling a diazotized compound of the formula

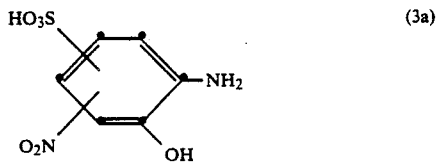

(3a)

onto the product obtained as per (b).

The novel polyazo dyes which are obtainable by the above methods in the form of a complex mixture of different components are isolated in the fora of their salts, in particular alkali metal, especially lithium, sodium or potassium salts, or ammonium salts or salts of organic amines having a positively charged nitrogen atom.

One component of the polyazo dyes according to the invention presumably conforms to the formula

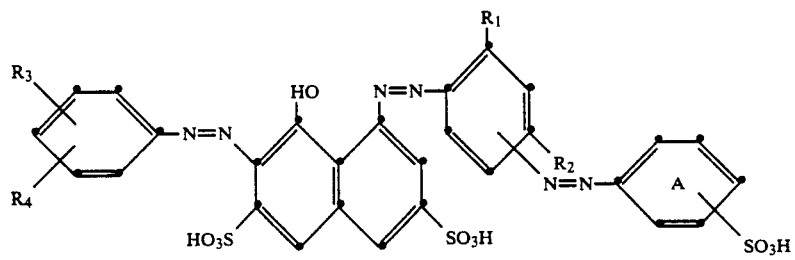

(4)

where $R_1$, $R_2$, $R_3$, $R_4$ and A are subject to the above-specified definitions and preferences, and comprise a further part of the subject-matter of the invention.

The dyes according to the invention are readily water-soluble anionic dyes which are generally suitable for dyeing anionically dyeable textile and nontextile substrates, for example for dyeing fibre material made of natural or regenerated cellulose, natural or synthetic polyamides, polyurethanes or cationically modified polyolefins, and also anodized aluminium, or leathers and pelts.

The dyes according to the invention can advantageously be used for example for dyeing cellulose web materials, wood and paper. Fibre materials which come into consideration are in particular cotton and natural polyamides such is wool and silk, while of the synthetic fibre materials nylon and cationically modified polypropylene are of chief interest.

The polyazo dyes obtained according to the invention are preferably suit able for dyeing pelts and in particular leather, all kinds of grain and suede leathers, for example chrome leather, retanned leather or suede leathers from goat, sheep, cattle and pig, being suitable.

The results obtained are predominantly brown colourings having good all-round fastness properties, for example light, water, wash, perspiration, dry-cleaning, acid, alkali, solvent and diffusion fastness vis-a-vis plasticized PVC. The dyes according to the invention are tinctorially strong and are high-hiding; they show good affinity and good resistance to electrolytes such as sodium ions or calcium ions and to chromium salts and in addition have good build-up properties on pure chrome leather and on retanned leather. Particularly notable are the comparatively very good water solubility of the dyes obtained according to the invention and their extremely low deflagration tendency.

The examples which follow serve to illustrate the invention without restricting it to them. Parts and percentages are by weight.

Example 1: 55.1 parts of 1-amino-8-hydroxynaphthalene-3,6-disulfonic acid are diazotized in a conventional manner and then added with stirring to a solution of 19 parts of 1,3-dihydroxybenzene in 196 parts of water and 15 parts of calcined sodium carbonate at 0°-5° C. while the pH is maintained at 8.5 to 9.0 by addition of sodium hydroxide solution. After the 1st coupling has ended, the diazo compound of 35.7 parts of 4-nitroaniline is added, and the pH during this 2nd coupling is maintained at 8.0 to 9.0 by addition of sodium hydroxide solution. The diazo compound of 20.2 parts of 2-amino-4-nitrophenol-6-sulfonic acid is run into the solution of the disazo dye formed while the reaction medium is kept slightly alkaline by addition of sodium hydroxide solution. The dye is then salted out with a mixture of potassium chloride and sodium chloride, filtered off and dried. The dark powder obtained dyes leather in a brown shade having good all-round fastness properties.

Example 2: Example 1 is repeated, except that 2-amino-4-nitrophenol-6sulfonic acid is replaced by an equivalent amount of 2-amino-6-nitrophenol-4-sulfonic acid, likewise affording a dye which dyes leather in a brown shade having good fastness properties.

Example 3: Example 1 is repeated, except that the suspension of the trisazo dye mixture obtained after the 3rd coupling is made neutral with hydrochloric acid, heated to 50° C. and then admixed with 51 parts of iron(III) chloride added in the course of about 20 minutes. Thereafter the reaction mixture is brought to a slightly acid pH (about 3-5) by adding 30% sodium hydroxide solution, heated to about 95° C. and kept at that temperature for about 1 hour. After cooling down, the dye, comprising the iron complex of the dye of Example 1, is as usual salted out, filtered off and dried.

Example 4: Example 1 is repeated, except that the suspension of the trisazo dye mixture obtained after the 3rd coupling is made slightly acid (pH≈5-6) with hydrochloric acid and 54 parts of copper sulfate are added at room temperature. This is followed by stirring at that temperature for about 2 hours during which the pH is kept slightly acid (about 3–4). The dye, which comprises the copper complex of the dye of Example 1, is then as usual salted out, filtered off and dried.

Dyeing method for leather 100 parts of apparel suede leather are drummed at 50° C. in a solution of 1,000 parts of water and 2 parts of 24% ammonia for 2 hours and then dyed for 1 hour at 60° C. in a solution of 1,000 parts of water, 2 parts of 24% ammonia and 3 parts of the dye of Example 1. A solution of 40 parts of water and 4 parts of 85% strength formic acid is then added, and dyeing is continued for a further 30 minutes. The leathers are then thoroughly rinsed and if necessary additionally treated with 2 parts of a dicyandiamide-formaldehyde condensation product at 50° C. for 30 minutes. The result obtained is a brown dyeing having good fastness properties.

What is claimed is:

1. A polyazo dye obtainable by
   ((a) diazotizing 1-amino-8-hydroxynaphthalene-3,6-disulfonic acid and coupling onto a compound of the formula

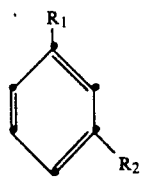
   (1)

where $R_1$ and $R_2$ are each hydroxyl,
   ((b) coupling diazotized o-, m-, or p-nitroaniline onto the product obtained above,
   ((c) coupling a diazotized compound of the formula

   (3a)

onto the product obtained above.

2. A polyazo dye according to claim 1, obtainable by performing coupling step ((a) at a pH of 8.0 to 9.0.

3. A polyazo dye according to claim 1 obtainable by performing coupling steps ((a), ((b) and ((c) each at a pH value of 8.0 to 9.0.

4. A polyazo dye obtainable by
   ((a) diazotizing 1-amino-8-hydroxynaphthalene-3,6-disulfonic acid and coupling onto a compound of the formula (1)

wherein $R_1$ and $R_2$ are each hydroxyl,
   ((b) coupling diazotized o- m-, or p-nitroaniline onto the product obtained above,
   ((c) coupling a diazotized compound of the formula

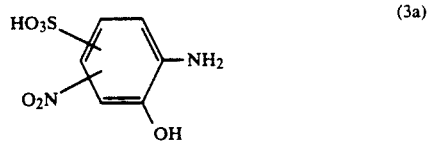
   (3a)

onto the product obtained above and
   (d) metallizing the product obtained above with an iron, cobalt, chromium, nickel or copper compound.

* * * * *